United States Patent
Jedraszczyk (10) Patent No.: US 10,787,265 B2
(45) Date of Patent: Sep. 29, 2020

(54) SUPPORT STRUCTURE FOR A FLIGHT ATTENDANT SEAT

(71) Applicant: Airbus Operations GmbH, Hamburg (DE)

(72) Inventor: Jan-Ole Jedraszczyk, Dollern (DE)

(73) Assignee: Airbus Operations GmbH, Hamburg (DE)

( * ) Notice: Subject to any disclaimer, the term of this patent is extended or adjusted under 35 U.S.C. 154(b) by 142 days.

(21) Appl. No.: 15/850,691

(22) Filed: Dec. 21, 2017

(65) Prior Publication Data

US 2018/0186459 A1     Jul. 5, 2018

(30) Foreign Application Priority Data

Dec. 22, 2016  (DE) .................. 10 2016 125 329

(51) Int. Cl.
    *B64D 11/06*     (2006.01)
(52) U.S. Cl.
    CPC ...... *B64D 11/0697* (2014.12); *B64D 11/0691* (2014.12)
(58) Field of Classification Search
    CPC ..... B64D 11/00; B64D 11/0023; B64D 11/06; B64D 11/0648; B64D 11/0691;
    (Continued)

(56) References Cited

U.S. PATENT DOCUMENTS

| 2,933,127 A * | 4/1960 | Brewster .............. B64D 11/064 |
| | | 297/216.2 |
| 4,523,730 A * | 6/1985 | Martin .................. B64D 25/04 |
| | | 244/122 R |

(Continued)

FOREIGN PATENT DOCUMENTS

| DE | 10008259 A1 | 9/2001 |
| DE | 69734433 T2 | 5/2006 |

(Continued)

OTHER PUBLICATIONS

German Search Report for German Application No. 102016125329.4 dated Oct. 30, 2017.

*Primary Examiner* — Magdalena Topolski
(74) *Attorney, Agent, or Firm* — Jerkins, Wilson, Taylor & Hunt, P.A.

(57) ABSTRACT

A support structure for a flight attendant seat, the support structure having supporting elements arranged at an upper and a lower end of the support structure. The supporting elements connect the support structure to an aircraft structure via fastening points, the support structure having receiving elements for receiving the flight attendant seat. The support structure has at least two substantially vertical elements and at least one substantially horizontal element. The vertical elements have at least one upper and one lower end, the supporting elements being attached to respective ends of the vertical elements and forming lattice struts. The support elements are designed to be connected to the aircraft structure at at least two attachment positions, at least two upper and two lower fastening points being selectable in their respective attachment position to the aircraft structure, at least one cabin element being adaptively attached to the support structure.

19 Claims, 10 Drawing Sheets

(58) Field of Classification Search
CPC ............ B64D 11/0696; B64D 11/0697; B64D 11/0698; B64D 25/04
USPC ........................................................ 244/122
See application file for complete search history.

(56) References Cited

U.S. PATENT DOCUMENTS

| | | | | |
|---|---|---|---|---|
| 4,525,010 A * | 6/1985 | Trickey | ................. | B64D 25/04 244/122 R |
| 4,911,381 A * | 3/1990 | Cannon | ............. | B64D 11/0696 244/122 R |
| 5,558,301 A * | 9/1996 | Kerdoncuff | ............ | B64D 25/04 244/118.6 |
| 6,007,025 A | 12/1999 | Coughren et al. | | |
| 6,152,401 A * | 11/2000 | Green | ...................... | B60N 2/24 244/118.6 |
| 6,467,728 B2 | 10/2002 | Angerami et al. | | |
| 6,565,151 B2 * | 5/2003 | Jarnail | ............... | B64D 11/0643 297/216.16 |
| 6,820,931 B2 * | 11/2004 | Ruff | ..................... | B60N 2/4242 297/216.17 |
| 8,226,163 B1 * | 7/2012 | Pearson | ............. | B64D 11/0696 296/68.1 |
| 8,376,306 B2 * | 2/2013 | Dowty | ............... | B61D 33/0057 248/429 |
| 8,944,380 B2 * | 2/2015 | Ehlers | ................ | B64D 11/0696 244/122 R |
| 8,960,602 B2 | 2/2015 | Neumann et al. | | |
| 9,180,968 B2 | 11/2015 | Helfrich et al. | | |
| 9,260,190 B2 * | 2/2016 | Ehlers | .................... | B64D 11/06 |
| 9,284,056 B2 * | 3/2016 | Mejuhas | ............ | B64D 11/0696 |
| 10,259,586 B2 * | 4/2019 | McIntosh | ........... | B64D 11/0697 |
| 2005/0173608 A1 * | 8/2005 | Lory | ..................... | B60P 7/0815 248/418 |
| 2006/0237586 A1 * | 10/2006 | Barackman | ............ | B64D 11/06 244/118.6 |
| 2009/0295208 A1 * | 12/2009 | Elhanati | .................. | B60N 2/24 297/273 |
| 2011/0011978 A1 * | 1/2011 | Haack | ................ | B64D 11/0696 244/119 |
| 2014/0125092 A1 | 5/2014 | Schreuder et al. | | |
| 2017/0267356 A1 | 9/2017 | Breuer et al. | | |

FOREIGN PATENT DOCUMENTS

| | | |
|---|---|---|
| DE | 102009010861 A1 | 10/2009 |
| DE | 102010064100 A1 | 6/2012 |
| DE | 102014225250 A1 | 6/2016 |
| EP | 3173331 A1 | 5/2017 |

* cited by examiner

SUPPORT STRUCTURE FOR A FLIGHT ATTENDANT SEAT

CROSS-REFERENCE TO RELATED APPLICATION

This application claims priority to German Patent Application DE 10 2016 125 329.4 filed Dec. 22, 2016, the entire disclosure of which is incorporated by reference herein.

TECHNICAL FIELD

The present disclosure relates to a support structure for a flight attendant seat, and to an aircraft with a support structure for a flight attendant seat.

BACKGROUND

The cabin of a modern aircraft is customarily divided into regions. The regions comprise, for example, a region for the passengers and a region for the service devices of the aircraft. Galley kitchen, doors, toilets and flight attendant seats are located in the service region, and the passenger seats are located in the passenger region. The two regions are customarily separated by walls on which flight crew equipment and also the flight attendant seats are also arranged.

DE 102010064100 A1 and DE 102009010861 A1 disclose partitions for separating regions in an aircraft. Furthermore, the walls from DE 102010064100 A1 have zones for receiving add-on parts.

DE 10008259 A1 discloses a supporting structure for receiving passenger supporting elements and therefore for providing space for the efficient transport of passengers.

SUMMARY

It is an object of the subject matter herein to disclose a solution for providing a support structure for an aircraft attendant seat. The support structure is intended to be configured for authorization according to the current international aviation regulations. Adaptively fitted cabin elements are advantageously not intended to require any new additional authorization for flight operation because of the direct attachment to the support structure.

A support structure for a flight attendant seat is specified, the support structure having supporting elements. The supporting elements are arranged at an upper and at a lower end of the support structure in such a manner that they connect the support structure to an aircraft structure via fastening points. The support structure has receiving elements for receiving the flight attendant seat. The receiving of one or more flight attendant seats is dependent on the number of flight attendants and can be accordingly selected by the airlines. The support structure can be installed flexibly in the aircraft cabin because of the standardized fastening points. An advantage of the support structure according to the disclosure herein is the adaptive attachment of cabin elements for separating regions of the aircraft cabin, for example separating the passenger region, from the service region.

A support structure according to the disclosure herein has at least two substantially vertical elements and at least one substantially horizontal element. In a preferred embodiment, the vertical elements are substantially rod-shaped. The two vertical elements each have an upper and a lower end. The supporting elements are attached to the upper and to the lower end of the vertical elements and substantially form a lattice structure. The supporting elements are substantially configured as lattice struts, and therefore they are connected starting from the ends of the vertical elements to the aircraft structure via at least two attachment positions. The attachment positions are produced via at least two upper and at least two lower fastening points. The fastening points can be freely selected here depending on the configuration of the aircraft cabin, in order to permit flexibility of the attachment to the aircraft structure. At least one cabin element is adaptively attached to the support structure.

The at least two vertical elements are connected via at least one horizontal element and form a capital letter "H". The support structure is substantially h-shaped.

At least two upper and at least two lower fastening points form a first predefined attachment position. The upper fastening points comprise structure holders in the aircraft cabin ceiling region. For the lower fastening points, screw connection points or seat rail fastenings are provided in the aircraft cabin floor region. Analogously to the first predefined attachment position, a second possible predefined attachment position can be selected, via the upper and lower fastening points. For the upper fastening points, structure holders are provided in the aircraft cabin ceiling region, for the lower fastening points screw connection points or seat rail fastenings are provided in the aircraft cabin floor region.

For the at least two attachment positions, a combination of screw connection points and seat rail fastenings is likewise included in the aircraft cabin floor region.

This flexibility in the aircraft cabin floor is an additional advantage in the configuration of the aircraft cabin space using the support structure with attached flight attendant seat(s) and/or cabin element(s). With the provision of predefined fastening points, an aircraft-related technical authorization of the support system, which is independent of the selected aircraft cabin layout, can be undertaken on different types of aircraft and aircraft structural geometries thereof. The development times and manufacturing times for the aircraft cabin layout selected by the customer can therefore be shortened.

The provided flight attendant seat and the frame elements thereof form the substantially horizontal element. The two vertical elements are therefore connected via the flight attendant seat.

A further advantageous refinement of the support structure can be achieved with at least one diagonal element as the connection of the vertical elements, the diagonal element replacing the horizontal element and being able to ensure a load-bearing capacity.

A support structure according to the disclosure herein also provides a possibility of attaching cabin elements adaptively to the support structure. The cabin elements used can comprise, for example, dividing walls. The dividing walls are also referred to in aircraft manufacturing as partitions. The dividing walls are adapted in their dimensions to the aircraft cabin geometry and enclose a region or separate two regions from each other. The dividing walls are customarily designed for lightweight construction. The use of lightweight materials and the combined adaptive attachment to a support structure provide the greatest possible flexibility. A plug-in compartment system for cabin elements provides the airlines with the possibility of individually adapting the interior of an aircraft cabin. For example, by the simple adaptation of dividing wall parts, individual configuration of the aircraft cabin can be simplified. The abovementioned flexibility of the aircraft cabin layout can be ensured by the support structure according to the disclosure herein and the attachment thereof of cabin elements. The described support structure can also form a side wall of a monument, for example of a galley kitchen or a toilet, or can be integrated in the side wall.

Furthermore, the support structure in an aircraft can also have at least one flight attendant seat and at least one partition. In this embodiment, the adaptive attachment of the cabin elements is clarified in FIG. 3.

The cabin elements used are adapted to the support structure in such a manner that they are attached to the outer and/or inner portions of the vertical element. This type of attachment then also provides sufficient space within the vertical elements in order to additionally attach further cabin elements. An exclusive attachment of cabin elements forms a separation of two regions. For example, the economy class passenger region can be separated from the business class passenger region. The adaptive cabin elements can also comprise curtains here. The combined attachment of cabin elements and a flight attendant seat is clarified in FIG. 3.

A support structure according to the disclosure herein is designed for a dynamic loading which acts on a flight attendant seat and corresponds to the customary and current international aviation regulations. The arrangement of the support structure and the supporting elements thereof ensures the necessary safety for the required minimum loading.

In one embodiment, the supporting elements for attachment to the aircraft structure additionally have at least one cross member. The cross member is directly connected in the aircraft cabin floor region to the fastening points present in the aircraft cabin floor. The strut-like supporting elements connect the cross member to the support structure. Analogously thereto, a cross member can be connected in the aircraft cabin ceiling region to the fastening points in the aircraft cabin ceiling by the supporting elements. The cross member is directly connected to the vertical elements. A substantial advantage of this embodiment is the independency of the position of the fastening points in the aircraft cabin floor and ceiling region. The cross member here forms a support upon attachment of the support structure to the aircraft structure.

An aircraft which has a support structure according to the subject matter herein is also disclosed.

All of the example figures are schematic illustrations of apparatuses according to the disclosure herein or components thereof. In particular, distances and size relationships are not reproduced true to scale in the figures. In the various figures, the same or identical elements are provided with the same reference signs.

DETAILED DESCRIPTION

Figure 1:
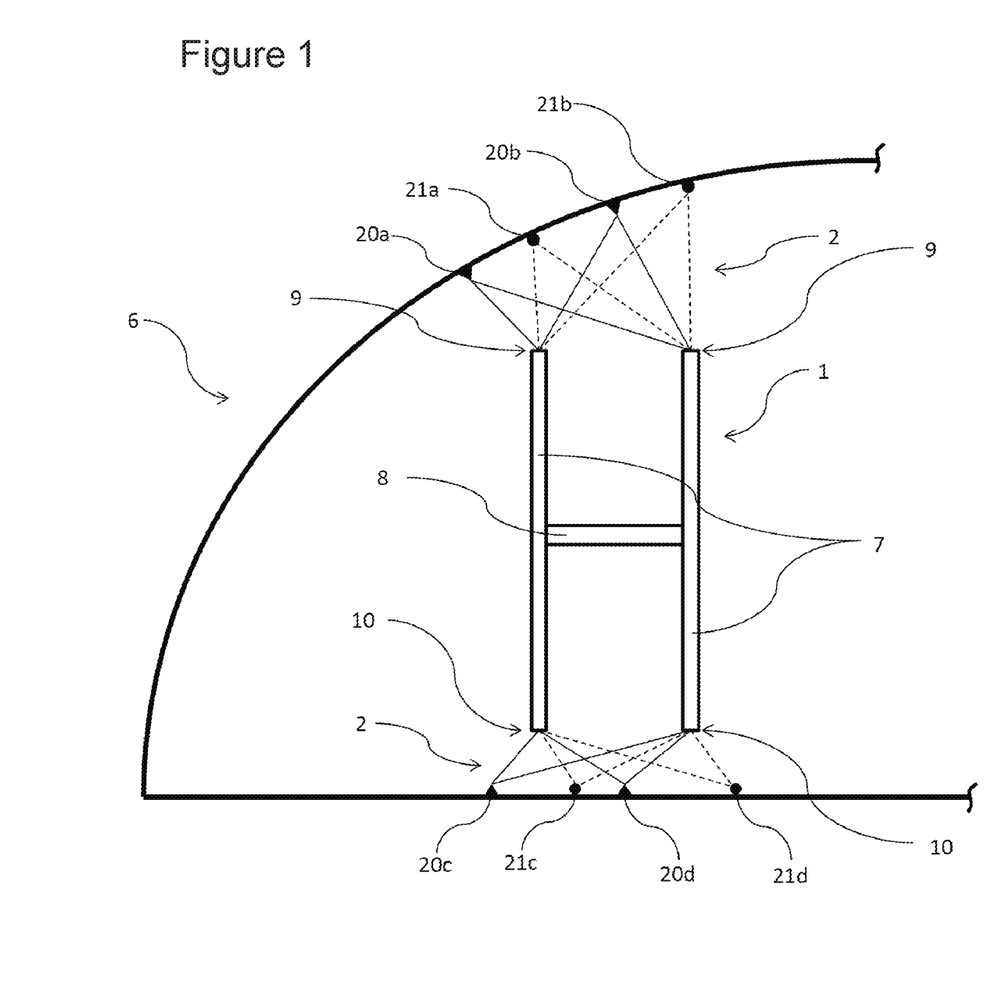
FIG. 1 shows a schematic illustration of the support structure.

FIG. 1 of the example drawings briefly described above shows a schematic illustration of the support structure 1 with the substantially vertical elements 7 and the horizontal element 8, the supporting elements 2 at the upper and at the lower end 9, 10 of the vertical elements 7, the upper and lower fastening points of the first and second connection position 20a, 20b, 20c, 20d, 21a, 21b, 21c, 21d and the surrounding aircraft structure 6, which is intended to essentially show a partial cutout of an aircraft cabin. The supporting elements 2 are arranged at the upper and at the lower end 9, 10 of the support structure 1 in such a manner that they form a direct connection to the aircraft structure 6. The attachment of the support structure 1 to the aircraft structure 6 via the supporting elements 2 is produced via the upper and lower fastening points of the first or second attachment position 20a, 20b, 20c, 20d, 21a, 21b, 21c, 21d. In FIG. 1, the first attachment position for the supporting elements 2 is provided with the solid lines. In this figure, the second attachment position for the supporting elements 2 is illustrated by dashed lines. The upper and lower fastening points of the first attachment position 20a, 20b, 20c, 20d are illustrated as triangle-like points on the aircraft structure 6, whereas the upper and lower fastening points of the second attachment position 21a, 21b, 21c, 21d are illustrated as circle-like points on the aircraft structure 6. In this embodiment, the horizontal element 8 is fitted at the same distance from the upper and lower end 9, 10 of the vertical elements 7 and is substantially rod-shaped. FIG. 1 clarifies the design of the support structure 1 as a structurally simple solution. At the same time, the figure illustrates the arrangement of the supporting elements 2 as lattice struts for attachment of the support structure 1 to the aircraft structure 6.

Figure 2:
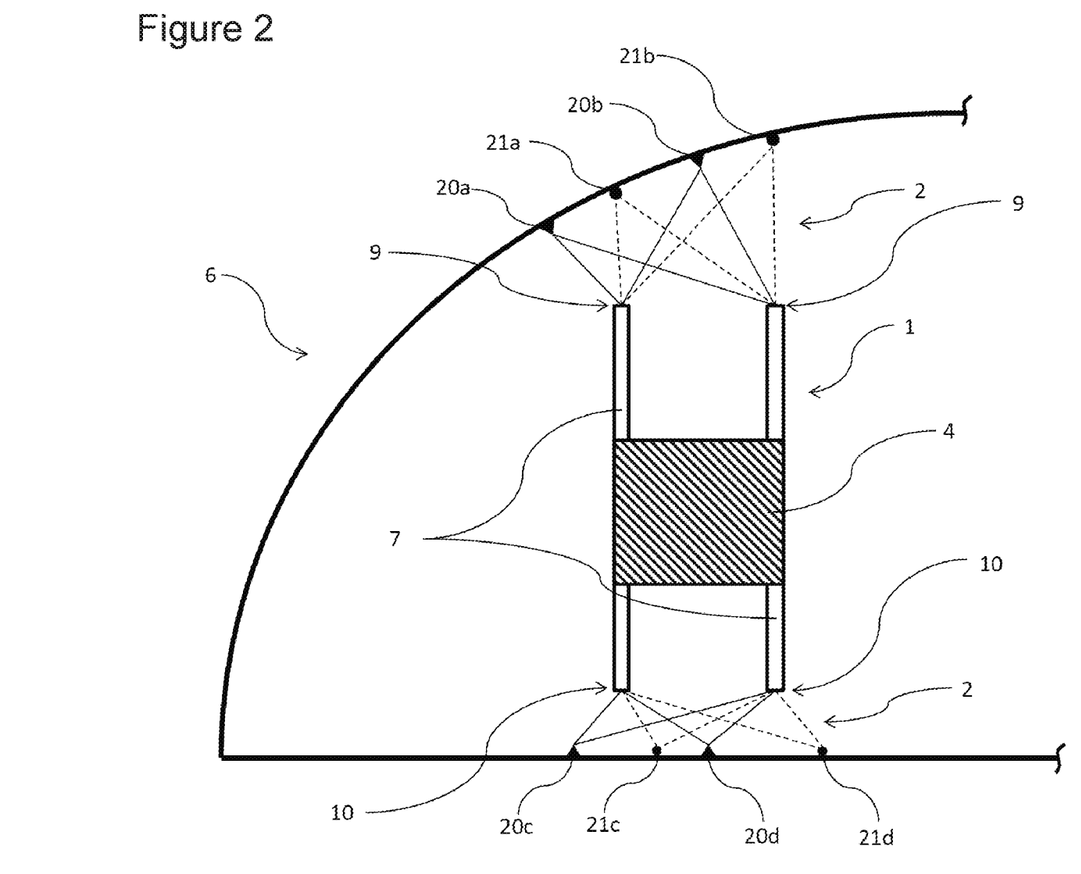
FIG. 2 shows a schematic illustration of the support structure with attached flight attendant seat.

FIG. 2 shows a schematic illustration of the support structure 1 with the substantially vertical elements 7 and a flight attendant seat 4, the supporting elements 2 at the upper and at the lower end 9, 10 of the vertical elements 7, the upper and lower fastening points of the first and second connection position 20a, 20b, 20c, 20d, 21a, 21b, 21c, 21d and the surrounding aircraft structure 6, which is intended to essentially show a partial cutout of an aircraft cabin. The supporting elements 2 are arranged at the upper and at the lower end 9, 10 of the support structure 1 in such a manner that they form a direct connection to the aircraft structure 6. The attachment of the support structure 1 to the aircraft structure 6 via the supporting elements 2 is produced via the upper and lower fastening points of the first or second attachment position 20a, 20b, 20c, 20d, 21a, 21b, 21c, 21d. In FIG. 2, the first attachment position for the supporting elements 2 is provided with the solid lines. In this figure, the second attachment position for the supporting elements 2 is illustrated by dashed lines. The upper and lower fastening points of the first attachment position 20a, 20b, 20c, 20d are illustrated as triangle-like points on the aircraft structure 6, whereas the upper and lower fastening points of the second attachment position 21a, 21b, 21c, 21d are illustrated as circle-like points on the aircraft structure 6. The flight attendant seat 4 is fitted on the two vertical elements 7 in a folded-up state, wherein the outer contour of the flight attendant seat 4 ends with the outer contour of the vertical elements 7. This exemplary embodiment shows a schematic attachment of the flight attendant seat 4 with a substantially identical distance from the upper and lower end 9, 10 of the vertical elements 7. Further possible attachment variants can have an advantageous effect on the static and dynamic properties of a support structure 1 according to the disclosure herein.

Figure 3:
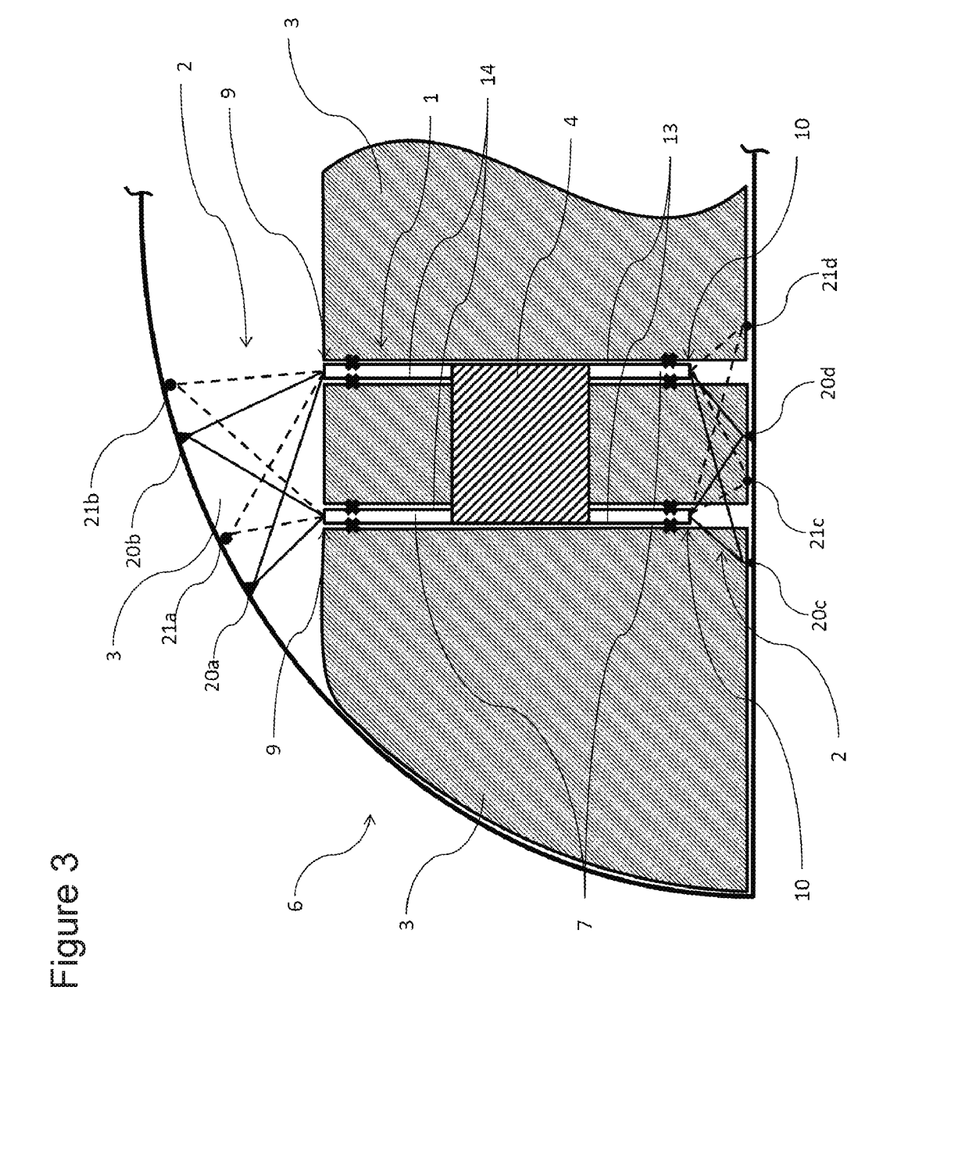
FIG. 3 shows a schematic illustration of the support structure with the combination of flight attendant seat and adaptively attached dividing walls.

FIG. 3 shows a schematic illustration of the support structure 1 with the combination of flight attendant seat 4 and adaptively attached cabin elements 3 as dividing walls, the supporting elements 2 at the upper and at the lower end 9, 10 of the vertical elements 7, the upper and lower fastening points of the first and second connection position 20a, 20b, 20c, 20d, 21a, 21b, 21c, 21d and the surrounding aircraft structure 6, which is intended to essentially show a partial cutout of an aircraft cabin. The supporting elements 2 are arranged at the upper and at the lower end 9, 10 of the support structure 1 in such a manner that they form a direct connection to the aircraft structure 6. The attachment of the support structure 1 to the aircraft structure 6 via the supporting elements 2 is produced via the upper and lower fastening points of the first or second attachment position 20a, 20b, 20c, 20d, 21a, 21b, 21c, 21d. In FIG. 3, the first attachment position for the supporting elements 2 is provided with the solid lines. In this figure, the second attachment position for the supporting elements 2 is illustrated by dashed lines. The upper and lower fastening points of the first attachment position 20a, 20b, 20c, 20d are illustrated as triangle-like points on the aircraft structure 6, whereas the upper and lower fastening points of the second attachment position 21a, 21b, 21c, 21d are illustrated as circle-like points on the aircraft structure 6. The flight attendant seat 4 is attached to the vertical elements 7, wherein the outer contour of the flight attendant seat 4 ends with the outer portions 13 of the vertical elements 7. In this embodiment, existing frame elements of the flight attendant seat 4 take on the function of the horizontal element 8. The cabin elements 3 are connected to the support structure 1 at the outer portions 13 of the vertical elements 7. A cabin element 3 is likewise attached to the inner portions 14 of the vertical elements 7. The cabin elements 3 are adapted with their outer contour to the profile of the aircraft cabin inner contour. They are advantageously designed in such a manner that they separate two regions in an aircraft. The dividing walls shield two regions from each other in such a manner that a privacy screen is produced.

Figure 4:
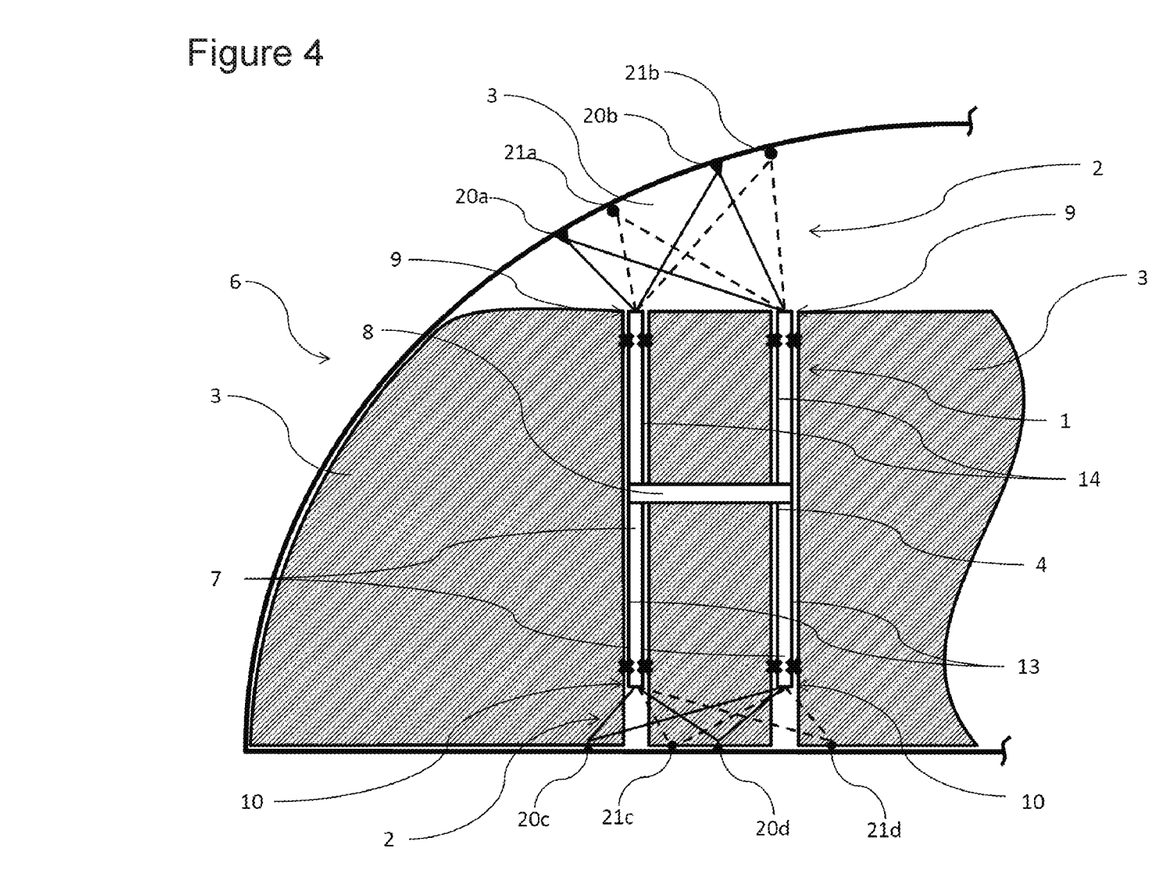
FIG. 4 shows a schematic illustration of the support structure only with adaptively attached cabin elements.

FIG. 4 shows a schematic illustration of the support structure 1 with the substantially vertical elements 7, the horizontal element 8 and cabin elements 3, the supporting elements 2 at the upper and at the lower end 9, 10 of the vertical elements 7, the upper and lower fastening points of the first and second connection position 20a, 20b, 20c, 20d, 21a, 21b, 21c, 21d and the surrounding aircraft structure 6, which is intended to essentially show a partial cutout of an aircraft cabin. The supporting elements 2 are arranged at the upper and at the lower end 9, 10 of the support structure 1 in such a manner that they form a direct connection to the aircraft structure 6. The attachment of the support structure 1 to the aircraft structure 6 via the supporting elements 2 is produced via the upper and lower fastening points of the first or second attachment position 20a, 20b, 20c, 20d, 21a, 21b, 21c, 21d. In FIG. 4, the first attachment position for the supporting elements 2 is provided with the solid lines. In this figure, the second attachment position for the supporting elements 2 is illustrated by dashed lines. The upper and lower fastening points of the first attachment position 20a, 20b, 20c, 20d are illustrated as triangle-like points on the aircraft structure 6, whereas the upper and lower fastening points of the second attachment position 21a, 21b, 21c, 21d are illustrated as circle-like points on the aircraft structure 6. The cabin elements 3 are in each case arranged on the outer and inner portions 13, 14 of the vertical elements 7. The outer geometry of the cabin elements 3 is designed in such a manner that they are adapted to the aircraft cabin inner contour. The separation of two regions by the cabin elements 3 is clarified in FIG. 4. The two cabin elements 3 form a dividing wall which, for example, separates the passenger region from the service region.

Figure 5:
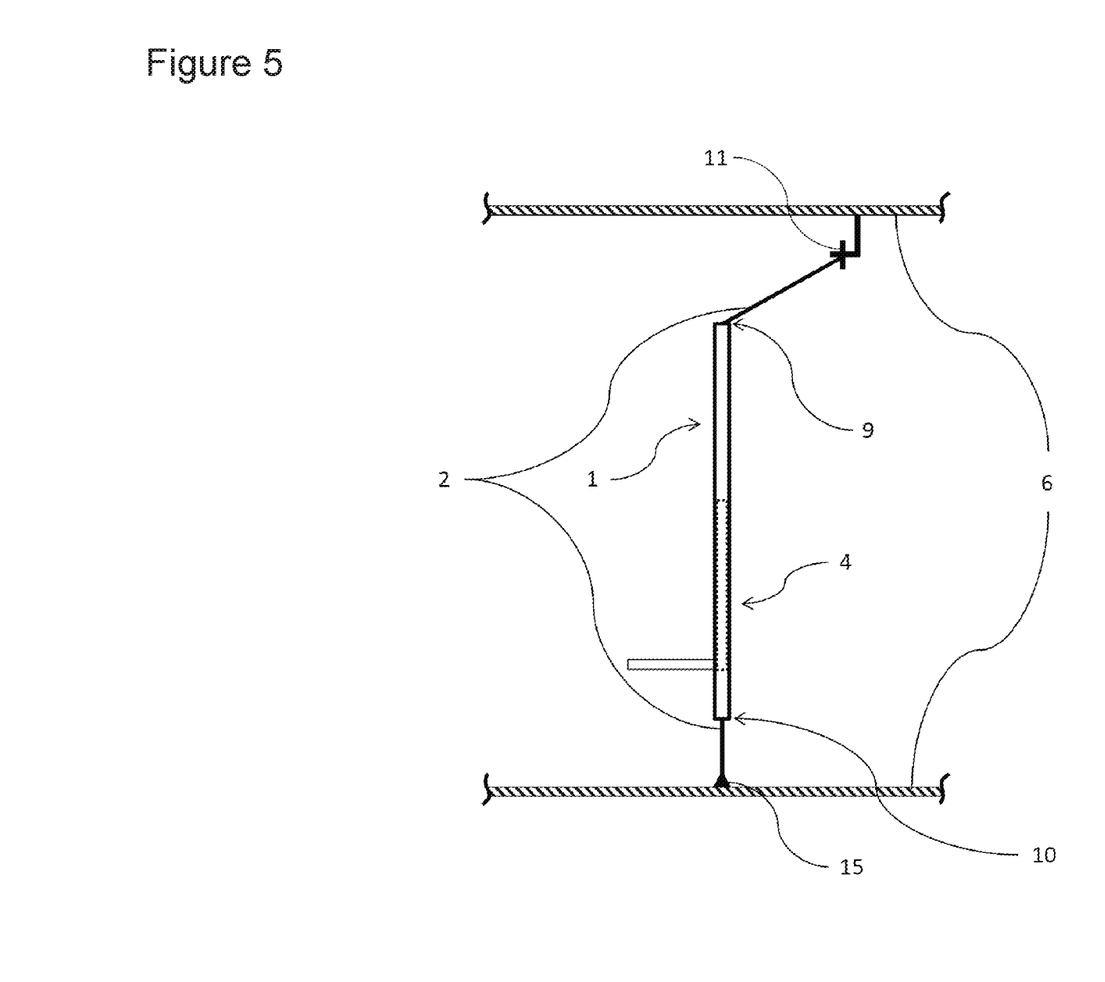
FIG. 5 shows a schematic illustration of the support structure with a flight attendant seat in side view.

FIG. 5 shows a schematic illustration of the support structure 1 with a flight attendant seat 4 in side view. The aircraft structure 6 is only partially illustrated and is intended to show the cutout of an aircraft cabin. The flight attendant seat 4 is located in an unfolded state. The flight attendant seat 4 is only illustrated schematically in the figure and is substantially located at a practicable height which easily enables a crew member to sit thereon. The attachment of the support structure 1 via the supporting elements 2 is illustrated here in a first attachment position. FIG. 5 shows the attachment of the support structure 1 to the aircraft structure 6 by structure holders 11 on aircraft frames in the aircraft cabin ceiling region and by, for example, screw connection points 15 in the cabin floor region.

Figure 6A:
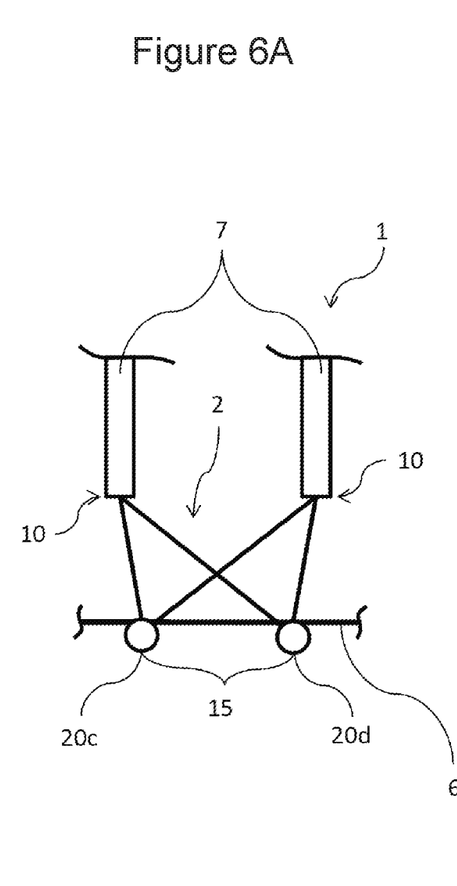
FIGS. 6A through 6C show a schematic illustration of the lower end of the support structure with the supporting elements and the fastening points.
Figure 6B:
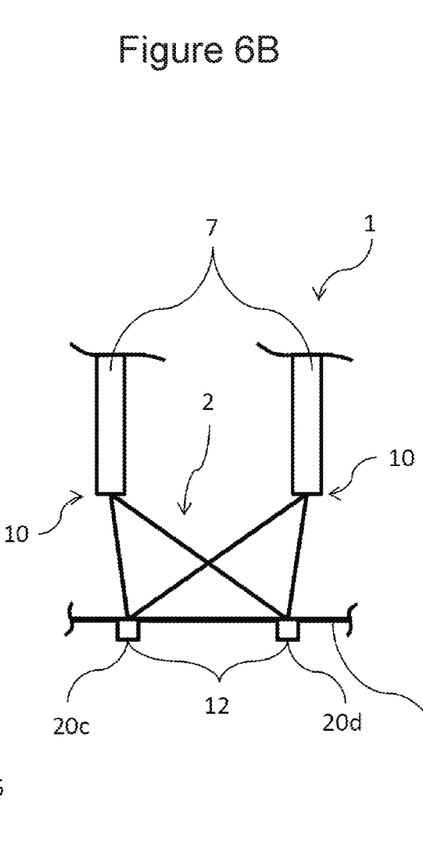
Figure 6C:
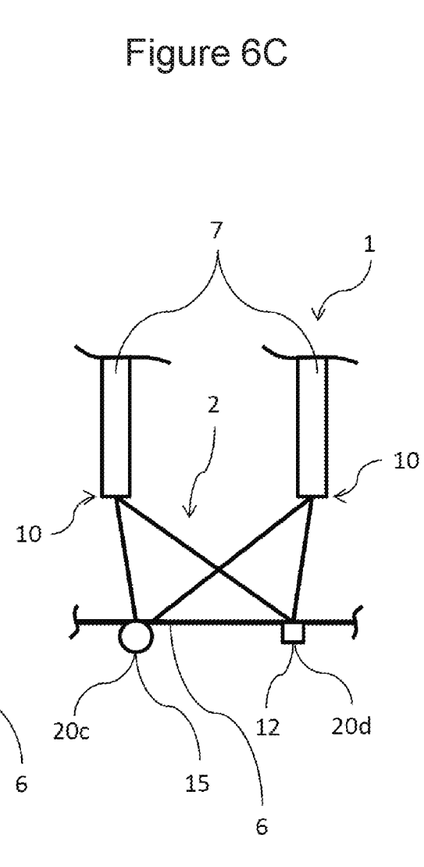

FIGS. 6A through 6C show a schematic illustration of the lower end 10 of the vertical elements 7 of the support structure 1 with the supporting elements 2 and the lower fastening points in a first attachment position 20c, 20d configured as screw connection points 15 or as seat rail fastenings 12. The aircraft structure 6 is only partially illustrated. FIG. 6A in particular shows a connection of the support structure 1 to the aircraft structure 6 via the lower fastening points of the first attachment position 20c, 20d, which are configured as screw connection points 15. FIG. 6B shows an attachment of the support structure 1 to the aircraft structure 6 with the lower fastening points of the first attachment position 20c, 20d via the seat rail fastenings 12. A combination of the selection of the lower fastening points of the first attachment position 20c, 20d is shown in FIG. 6C. The possibility of simultaneous use of screw connection points 15 and seat rail fastening 12 is clarified here. A substantial advantage of this possibility is the flexibility of the attachment of a support structure 1 in the aircraft cabin construction. Depending thereon, the support structure 1 and the cabin elements attached thereto can be fitted in the aircraft cabin at a plurality of possible positions. According to the disclosure herein wherever standardized upper and lower fastening points are located. In FIGS. 6A, 6B and 6C, the supporting elements 2 are designed as lattice-like, substantially rod-shaped struts.

Figure 7A:
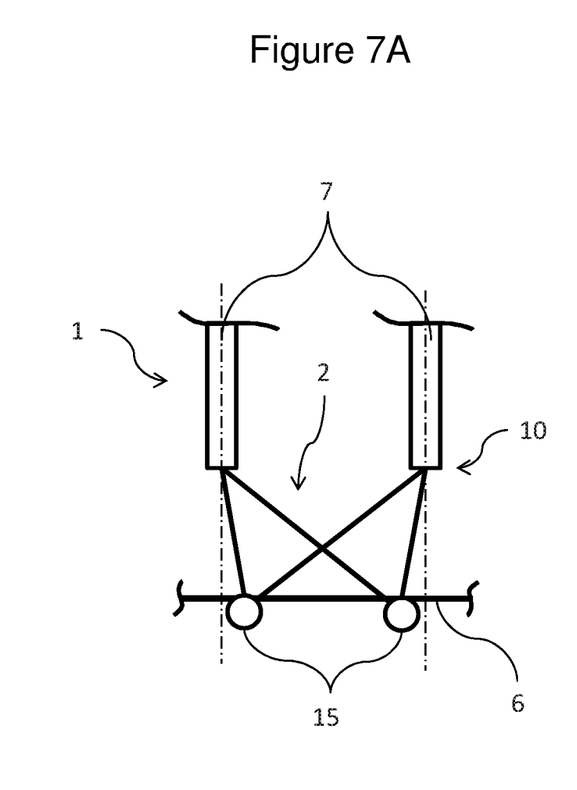
FIGS. 7A and 7B show a schematic illustration of the support structure in two possible attachment positions.
Figure 7B:
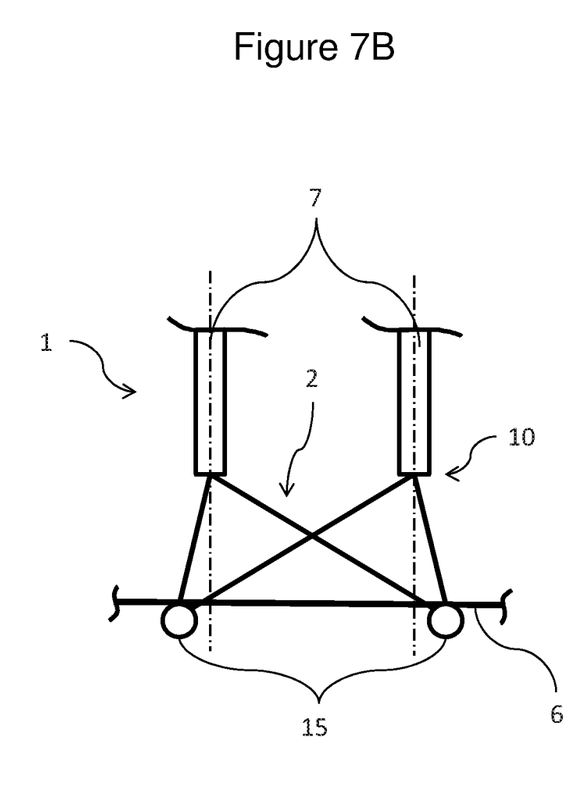

FIGS. 7A and 7B show two possible attachment positions of the supporting elements 2 of a support structure 1 on the aircraft structure 6. In this case, the fixing in the aircraft cabin floor region is produced via the screw connection points 15. The arrangement of the strut-like supporting elements 2 at the lower end 10 of the support structure 1 is similar to a lattice. It is apparent that the supporting elements 2 of a possible attachment position are connected to the aircraft structure 6 by fastening points which can either lie between the vertical elements 7 (FIG. 7A) or else outside the extension of the longitudinal axis of the vertical elements 7 (FIG. 7B).

Figure 8A:
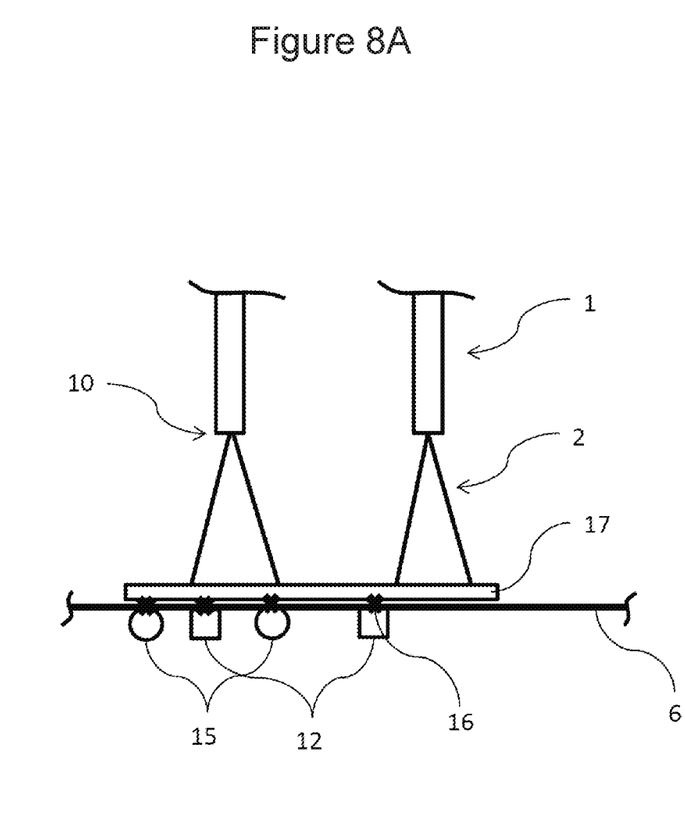
FIGS. 8A and 8B show a schematic illustration of the support structure in the aircraft cabin floor region with the supporting elements, fastening points and a cross member.
Figure 8B:
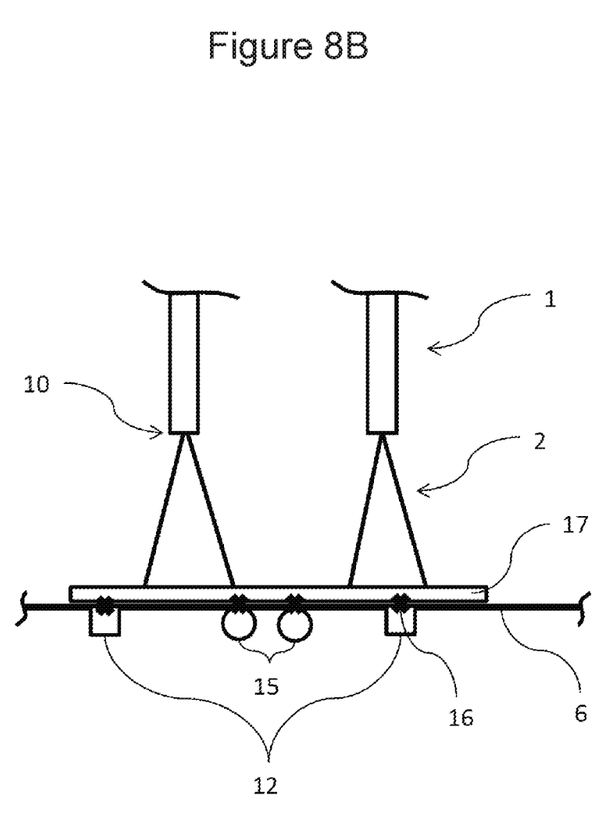

FIGS. 8A and 8B show, in a further embodiment, the lower end 10 of the support structure 1 with the supporting elements 2, the screw connection points 15 and the seat rail fastenings 12, the aircraft structure 6 in the aircraft cabin floor region and a cross member 17. The attachment of the support structure 1 to the aircraft structure 6 with the supporting elements 2 is produced by a cross member 17. The screw connection points 15 and the seat rail fastenings 12 in the aircraft cabin floor are illustrated in a first possible arrangement in FIG. 8A. The screw connection points and seat rail fastenings are fixed to the cross member 17 by attachment elements 16. FIG. 8B shows a second possible arrangement. The two figures clarify the attachment of the support structure 1 to the aircraft structure 6, the attachment being independent of the screw connection points 15 and the seat rail fastenings 12. The different arrangement can be attributed to the different types of aircraft. In the two figures, the supporting elements 2 each take up the same attachment position.

Figure 9:
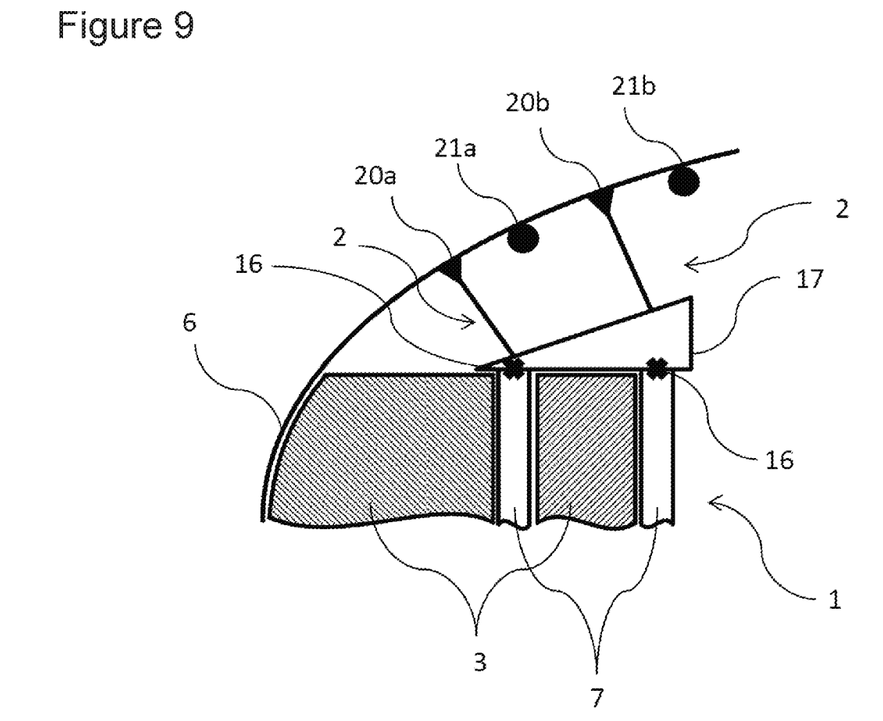
FIG. 9 shows a schematic illustration of the support structure in the aircraft cabin ceiling region with cabin elements, the supporting elements, fastening points and a cross member.

FIG. 9 partially shows the support structure 1 as a schematic illustration in the aircraft cabin ceiling region. This figure clarifies the attachment of the support structure 1 having two adaptively attached cabin elements 3 to the aircraft structure 6 by the support elements 2 and a cross member 17, which is of substantially triangular configuration. The shape of the cross member 17 can vary and is dependent on the aircraft cabin geometries and design-related technical specifications for introducing load. The cabin elements 3 are fixed to the support structure 1. In this figure, the upper and lower fastening points of the first attachment position 20a, 20b, 21a, 21b are illustrated. The supporting elements 2 are fixed here to the fastening points of the first attachment position 20a, 20b. The cross member 17 is directly connected to the vertical elements 7 of the support structure 1 via attachment elements 16.

Figure 10:
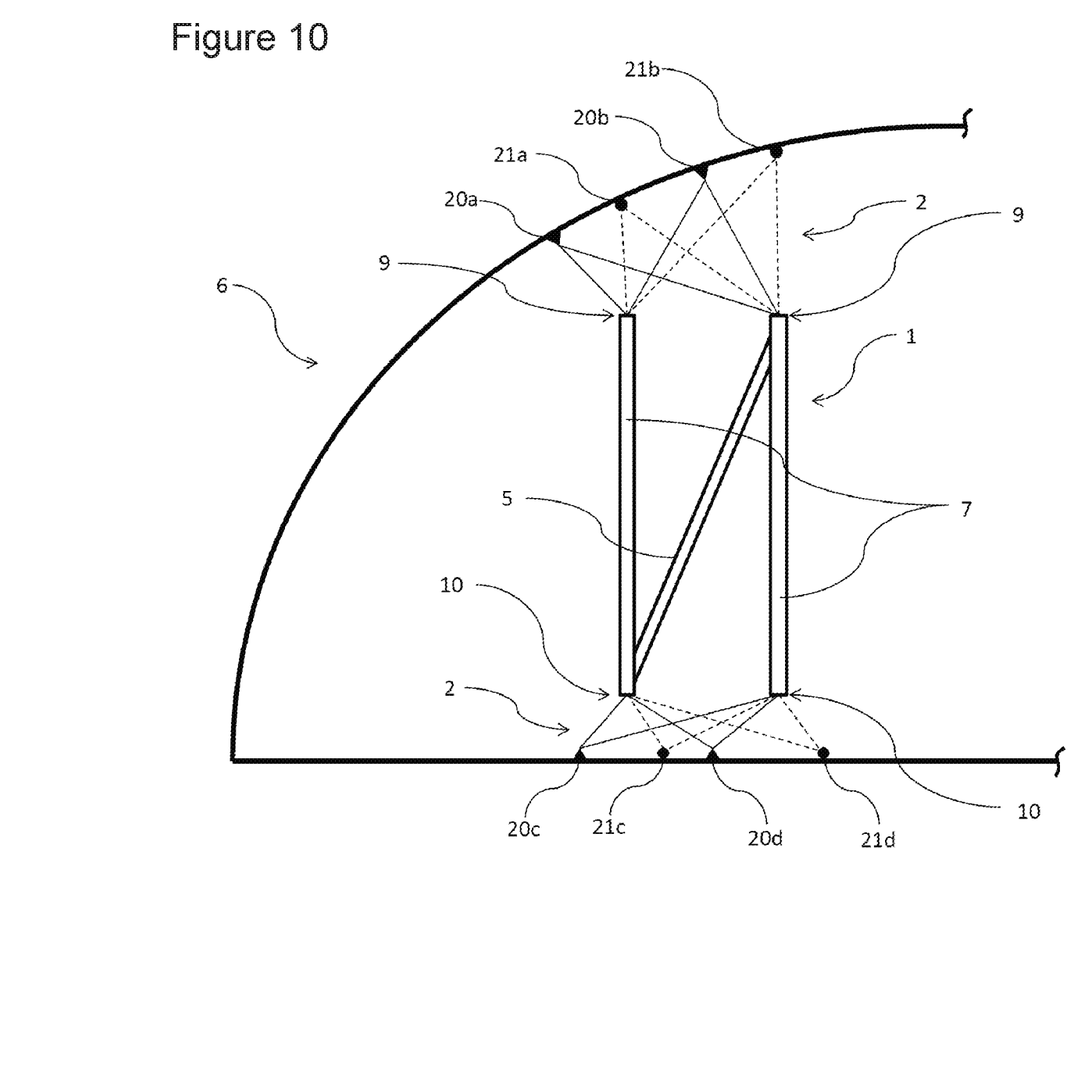
FIG. 10 shows a schematic illustration of the support structure with a diagonal element.

FIG. 10 shows a schematic illustration of the support structure 1 with the substantially vertical elements 7 and a diagonal element 5, the supporting elements 2 at the upper and at the lower end 9, 10 of the vertical elements 7, the upper and lower fastening points of the first and second attachment position 20a, 20b, 20c, 20d, 21a, 21b, 21c, 21d and the surrounding aircraft structure 6, which is intended to essentially show a partial cutout of an aircraft cabin. The supporting elements 2 are arranged at the upper and at the lower end 9, 10 of the support structure 1 in such a manner that they form a direct connection to the aircraft structure 6. The attachment of the support structure 1 to the aircraft structure 6 via the supporting elements 2 is produced via the upper and lower fastening points of the first or second attachment position 20a, 20b, 20c, 20d, 21a, 21b, 21c, 21d. In FIG. 10, the first attachment position for the supporting elements 2 is provided with the solid lines. In this figure, the second attachment position for the supporting elements 2 is illustrated by dashed lines. The upper and lower fastening points of the first attachment position 20a, 20b, 20c, 20d are illustrated as triangle-like points on the aircraft structure 6, whereas the upper and lower fastening points of the second attachment position 21a, 21b, 21c, 21d are illustrated as circle-like points on the aircraft structure 6. The diagonal element 5 is arranged in such a manner that it runs from the lower end 10 of the one vertical element 7 to the upper end 9 of the other vertical element 7. Use of a diagonal element 5, as shown in FIG. 10, can stiffen the construction and enables dissipation of loads. The diagonal element 5 replaces the horizontal element (not shown) here.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMBERS 1. support structure
2. supporting element
3. cabin element
4. flight attendant seat
5. diagonal element
6. aircraft structure
7. vertical element
8. horizontal element
9. upper end of the support structure
10. lower end of the support structure
11. structure holder
12. seat rail fastening
13. outer portion of the vertical element
14. inner portion of the vertical element
15. screw connection point
16. attachment element
17. cross member
20a. upper first fastening point for the first attachment position
20b. upper second fastening point for the first attachment position
20c. lower first fastening point for the first attachment position
20d. lower second fastening point for the first attachment position
21a. upper first fastening point for the second attachment position
21b. upper second fastening point for the second attachment position
21c. lower first fastening point for the second attachment position
21d. lower second fastening point for the second attachment position

The invention claimed is:

1. A support structure for a flight attendant seat, the support structure comprising:
supporting elements arranged at an upper and at a lower end of the support structure that are configured to connect the support structure to an aircraft structure at least at first and second predefined attachment positions via fastening points thereof, respectively;
at least first and second elements that each extend in a vertical direction, the first and second elements each comprising at least one upper and one lower end; and
at least one third element that extends in a horizontal direction;

wherein a first set of the supporting elements are attached to the respective upper ends of the first and second elements and form a first set of lattice struts, and a second set of the supporting elements are attached to the respective lower ends of the first and second elements and form a second set of lattice struts;

wherein the fastening points of the first and second predefined attachment positions are freely selectable to attach the support structure to the aircraft structure;

wherein the support structure is configured to receive the flight attendant seat; and wherein the support structure is configured such that at least one cabin element is adaptively attachable to the support structure.

2. The support structure according to claim 1, wherein the support structure is H-shaped.

3. The support structure according to claim 1, wherein the fastening points comprise lower fastening points, which are screw connection points or seat rail fastenings in the aircraft structure.

4. The support structure according to claim 1, wherein the fastening points comprise lower fastening points, which are a combination of screw connection points and seat rail fastenings in the aircraft structure.

5. The support structure according to claim 1, wherein the fastening points comprise upper fastening points, which are structure holders on the aircraft structure.

6. The support structure according to claim 1, wherein one or more of the at least one third element is in a form of at least one diagonal element.

7. The support structure according to claim 1, wherein the at least one cabin element comprises a cabin wall or partition.

8. A system comprising:
at least one support structure according to claim 1; and
at least one flight attendant seat.

9. The support structure according to claim 1, wherein one or more of the at least one cabin element is adaptably attachable to outer and/or inner portions of the first and second elements.

10. The support structure according to claim 1, wherein the support structure is configured for a dynamic loading which acts on an aircraft attendant seat.

11. The support structure according to claim 1, wherein a plurality of the supporting elements are interconnected by at least one cross member.

12. The system according to claim 8, comprising at least one cabin element.

13. An aircraft cabin comprising an aircraft structure and a support structure according to claim 1.

14. The aircraft cabin according to claim 13, wherein:
at least two upper and two lower first fastening points form the first predefined attachment position;
wherein at least two upper and two lower second fastening points form the second predefined attachment position;
wherein the first and second predefined attachment positions are freely selectable to attach the support structure to the aircraft structure.

15. The aircraft cabin according to claim 14, wherein:
the supporting elements are rod-shaped struts;
the first set of the supporting elements is configured to connect the first and second elements to the at least two upper fastening points; and
the second set of the supporting elements is configured to connect the first and second elements to the at least two lower fastening points.

16. The aircraft cabin according to claim 15, wherein the first set of the supporting elements comprises at least four upper supporting elements and the second set of the supporting elements comprises at least four lower supporting elements.

17. The aircraft cabin according to claim 16, wherein:
at least two of the upper supporting elements of the first set of the supporting elements are attached between an upper end of the first element and either the at least two upper first fastening points or the at least two upper second fastening points; and
at least another two of the upper supporting elements of the first set of the supporting elements are attached between an upper end of the second element and a same of the at least two upper first fastening points or the at least two upper second fastening points to which the at least two of the upper supporting elements are attached.

18. The aircraft cabin according to claim 17, wherein:
at least two of the lower supporting elements of the second set of the supporting elements are attached between a lower end of the first element and either the at least two lower first fastening points or the at least two lower second fastening points; and
at least another two of the lower supporting elements of the second set of the supporting elements are attached between a lower end of the second element and a same of the at least two lower first fastening points or the at least two lower second fastening points to which the at least two of the lower supporting elements are attached.

19. The aircraft cabin according to claim 16, wherein:
at least two of the upper supporting elements of the first set of the supporting elements are attached between an upper end of the first element and either the at least two upper first fastening points or the at least two upper second fastening points;
at least another two of the upper supporting elements of the first set of the supporting elements are attached between an upper end of the second element and a same of the at least two upper first fastening points or the at least two upper second fastening points to which the at least two of the upper supporting elements are attached;
at least two of the lower supporting elements of the second set of the supporting elements are attached between a lower end of the first element and either the at least two lower first fastening points or the at least two lower second fastening points; and
at least another two of the lower supporting elements of the second set of the supporting elements are attached between a lower end of the second element and a same of the at least two lower first fastening points or the at least two lower second fastening points to which the at least two of the lower supporting elements are attached.

* * * * *